Nov. 8, 1927.

J. L. SHROYER

COFFEE URN

Filed Aug. 1, 1924

1,648,699

Inventor
Jacob L. Shroyer
by
His Attorney

Patented Nov. 8, 1927.

1,648,699

UNITED STATES PATENT OFFICE.

JACOB L. SHROYER, OF OAK PARK, ILLINOIS, ASSIGNOR TO EDISON ELECTRIC APPLIANCE COMPANY, INC., OF CHICAGO, ILLINOIS, A CORPORATION OF NEW YORK.

COFFEE URN.

Application filed August 1, 1924. Serial No. 729,636.

My invention relates to coffee urns or apparatus for making coffee in general, and has for its object a simple, reliable and efficient construction and arrangement of apparatus whereby various operations incident to the making and serving of coffee are facilitated.

Although not limited thereto, my invention relates more particularly to heavy duty coffee urns such as may be used in hotels and restaurants. In carrying out my invention, I place the hot water tank above the prepared coffee tank and place the ground coffee container in a chamber between the two tanks from which it may be removed through a suitable door in the side of the urn. By means of this arrangement, the ground coffee container is lowered to such a position that it may be conveniently removed for cleaning and refilling without the use of a step ladder. I have also provided a hot water jacket for the prepared coffee tank and heating means so arranged that the hot water tank and jacket may be heated together or cold water admitted to the tank and heated independently of the hot water in the jacket in preparation for another batch of coffee.

Figure 1:
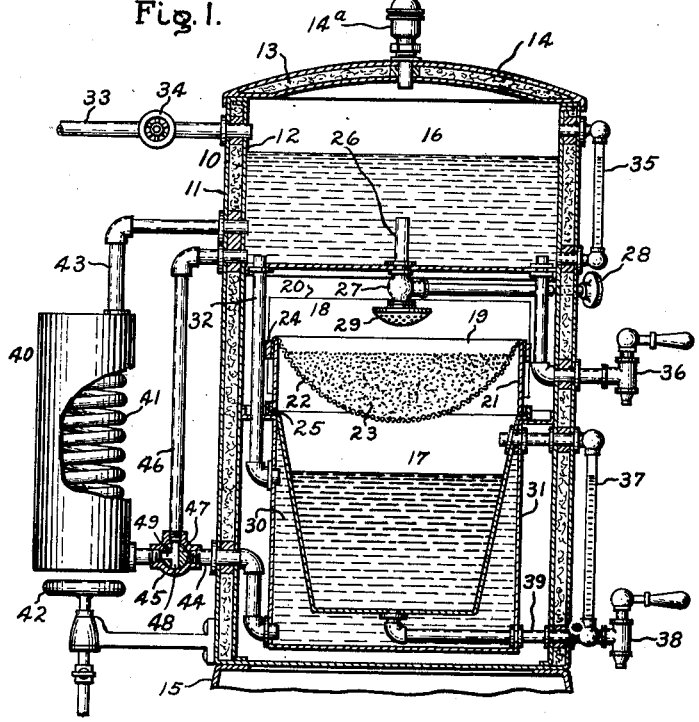
Figure 4:
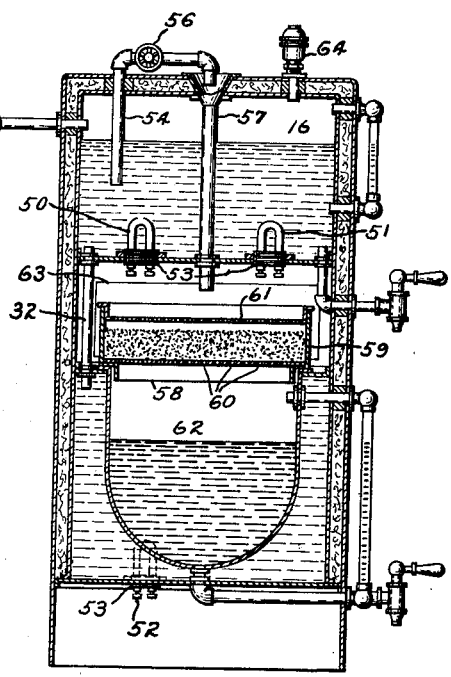
Figure 2:
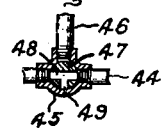
Figure 3:
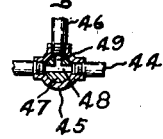

For a more complete understanding of my invention, reference should be made to the accompanying drawing in which Fig. 1 is an elevation view in section of an urn embodying my invention, Figs. 2 and 3 are fragmentary sectional views showing various positions of the water valve; while Fig. 4 is a view similar to Fig. 1 showing a modification of my invention.

Referring to Fig. 1 of the drawing, in carrying out my invention in one form I provide a suitably shaped casing or containing member 10 forming the body of the urn. This body member may be and is shown as being cylindrical. It is preferably heat insulated and may comprise outer and inner walls 11 and 12 between which is packed heat insulating material 13, such as asbestos. A tightly fitting removable cover 14 of similar construction is provided. In the cover is a steam safety outlet 14ª. The body member may be mounted on a suitable supporting base 15.

In the top of the body member 10 is a tank 16 for the hot water, and in the bottom is a tank 17 for the prepared coffee. These two tanks are spaced apart to provide a central chamber 18 for the ground coffee container 19 which is of such size that it may be removed conveniently from the side of the urn through a door 20. The ground coffee container preferably consists of a metallic ring 21 which forms a support for a flexible member 22 made of porous material, such as a fabric, in which the ground coffee 23 is placed. The member 22 is secured at its edge to the supporting ring 21 by means of a clamping ring 24. The upper edge of the prepared coffee tank 17 is offset outward to form a ledge 25 on which the ground coffee container rests.

Hot water from the tank 16 can be supplied through a pipe 26 extending centrally through the bottom of the tank 16 and provided with a valve 27, the stem of which extends through the body member and is provided with a knob 28 by means of which the valve may be regulated. On the lower end of pipe 26 is a spray 29 which distributes the water uniformly over the ground coffee 23. After percolating through the ground coffee, the hot water drips through the member 22 into the tank 17. Preferably the pipe 26 extends upward into tank 16 a short distance so that the tank cannot be emptied.

Around the prepared coffee tank 17 is a water jacket 30 which, it is contemplated, will be filled with hot water so as to prevent cooling of the prepared coffee. Furthermore, the prepared coffee may be reheated by supplying hot water to the water jacket. As shown, the tank 17 has the shape of an inverted truncated cone and is surrounded by a cylindrical tank 31 whereby the water jacket space 30 is provided. A pipe 32 connects the bottom of tank 16 with the top of the water jacket.

Water may be supplied to the tank 16 from any suitable source, such as the city water main, through a pipe 33 provided with a valve 34. A water level indicator glass 35 is provided for tank 16. The water jacket is maintained full from the supply in tank 16 by means of the pipe 32. Hot water may be withdrawn from tank 16 through a faucet 36. The prepared coffee tank 17 is likewise provided with a coffee level indicator glass 37, and with a faucet 38 connected to the bottom of tank 17 through a pipe 39. The prepared coffee may be drawn through the faucet 38.

The water in tank 16 and in the water jacket may be heated by means of a suitable circulation type water heater 40 which is external to the urn. This heater comprises a coiled pipe 41 in which the water is heated in any desired manner as, for instance, by means of a gas burner 42. The pipe 41 is connected at the top to the tank 16 through a pipe 43, the connection between the pipe 43 and the tank being below the upper orifice of pipe 26 so that the water heating circuit through pipe 41 will be maintained by the water remaining in the tank after a batch of coffee has been made. The lower end of the pipe 41 is connected to the water jacket 30 at its bottom through a pipe 44 provided with a selective valve 45. Leading from the valve 45 is a pipe 46 which opens into the bottom of tank 16.

The rotatable core 47 of the valve 45 is provided with an aperture 48 extending crosswise through it and a second aperture 49 intersecting the first. When the valve is turned to the position shown in Fig. 1, the heater is connected with the tank 16 only, and, therefore, the water in the tank alone is heated. With the valve in this position the hot water from the heater rises and passes into the tank through pipe 43 while the cold water in the bottom of the tank settles downward through pipe 46 and the valve into the heater. This connection with the heater makes it possible to heat a supply of cold water in tank 16 at the same time that a previously prepared quantity of hot coffee in tank 17 is being used. By turning the valve through a 90 degree angle in a counter clockwise direction to the position shown in Fig. 2, the water heater may be connected directly to the bottom of the water jacket, the connection with the pipe 46 being closed. With the valve in this position the water in both the tank 16 and the water jacket may be heated at the same time, the hot water rising from the heater into the tank 16 as before and the cold water settling through the pipe 32, the water jacket, pipe 44, and valve 45 to the heater. By turning the valve 45 90 degrees in a clockwise direction from the position shown in Fig. 1 to the position shown in Fig. 3, the tank and the water jacket may be connected to the water heater in parallel with each other.

In the operation of the urn, a sufficient quantity of water is first admitted to the tank 16 through the pipe 33, the water jacket at the same time being filled from the tank 16 through the pipe 32. The water in both the tank and the jacket is then heated, the valve 45 then being in either the position shown in Fig. 2 or the position shown in Fig. 3, as desired. After the water has been heated, valve 27 will be opened and the hot water allowed to escape onto the ground coffee until the desired amount of liquid coffee has been prepared as indicated by the glass 37. Since the water heating circuit is maintained by the water remaining in the tank 16, the water in the jacket may be heated when necessary to prevent cooling of the prepared coffee.

While the prepared coffee in tank 17 is being used, the tank 16 may be refilled with cold water through valve 34, this cold water heated, and fresh ground coffee put in the ground coffee receptacle 21 ready for the preparation of another batch of coffee. When heating a fresh supply of water in tank 16, the valve 45 is turned to the position shown in Fig. 1 so that the cold water cannot circulate through the jacket. In the meantime, the prepared coffee is kept hot by the hot water entrapped in the water jacket. After the water in tank 16 has been heated to a boiling temperature, the prepared coffee in tank 17 may be reheated if necessary by turning valve 45 to the position shown in Fig. 2 whereby the boiling water in the tank is caused to circulate downward through the water jacket and heater.

In the modified form of my invention shown in Fig. 4, electric heating means is provided. This electric heating means consists of a plurality of heating units 50 and 51 secured in the bottom of the tank 16 and one or more heating units 52 likewise secured in the bottom of the water jacket. The tank and the jacket are connected as before through a pipe 32. The heating units may be of any suitable type. Preferably they are of the helical coil sheathed wire type such as shown in United States Patent No. 1,367,341 to Abbott, dated Feb. 1, 1921. Each unit consists of a length of sheathed wire which is bent in the form of a hair pin and secured to a plug 53 so that its ends, which are provided with suitable terminals, are external to the plug. These heating units may be conveniently applied by simply inserting them in tapped holes in the walls of the tanks and screwing their plug supports into the tapped holes.

In this form, water is forced by steam pressure from the hot water tank upward through a pipe 54 provided with an external valve 56. This pipe empties into a central pipe 57 which extends downward through the hot water tank and empties into the ground coffee container 58. The pipe 54 should extend downward just far enough to withdraw the required amount of water but leave water enough to cover the heating units so that the tank cannot be overheated. By means of this arrangement, it is impossible to apply hot water to the ground coffee until it has reached the boiling point since the water must be forced out by steam pressure. This is also true with the arrangement of Fig. 1, for if it is attempted to withdraw water from tank 16 before it boils a vacuum will be created which will prevent the free discharge of water.

The coffee container is of a somewhat different construction than that shown in Fig. 1. It consists of a cylindrical receptacle 59 provided with apertures 60 in its bottom and with a perforated cover 61 by means of which water supplied through pipe 57 is distributed uniformly over the coffee. This coffee container sets over the prepared coffee tank 62 and may be removed from the side of the urn through a door 63 for refilling or cleaning. A steam safety valve 64 is provided for tank 16.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States is,—

1. A coffee urn having a receptacle for the coffee grounds, a reservoir below it for the liquid coffee, a heating chamber above the receptacle, means for heating the water in the chamber, a spray nozzle above the receptacle and a duct leading from the heating chamber to the spray nozzle for spraying water upon the coffee grounds.

2. A coffee urn having a heating chamber for supplying hot water to the coffee grounds, an external water heater, and pipe connections forming a circuit leading from the external heater to the heating chamber and from the heating chamber back to the heater whereby the water in the heating chamber may be raised to and kept at a high temperature from a source of heat external to the body of the urn.

3. A coffee urn having a reservoir for the liquid coffee, a water jacket surrounding it, an external water heater, and connections whereby hot water may flow from the upper portion of the heater to the water jacket and from the water jacket to the lower portion of the heater.

4. A coffee urn having a reservoir for the liquid coffee, said reservoir being open at the top, a receptacle for the coffee grounds seating at the top of said reservoir, a nozzle for spraying hot water onto the coffee grounds, a heating chamber for water located above the spray, a pipe leading from said heating chamber to the spray nozzle for supplying hot water thereto, a water heater, and pipe connections between the water heater and the heating chamber forming a water circuit whereby the water in the heating chamber may be raised to and kept at high temperature.

5. A coffee urn having a reservoir for the liquid coffee, a water jacket surrounding it, a water heating chamber, a pipe leading from the water jacket to the chamber, a second pipe leading from the heating chamber to the water jacket, and means for heating the water in said heating chamber.

6. A coffee urn having a reservoir for the liquid coffee, a water jacket surrounding it, a water heating chamber, pipe connections leading from the heating chamber to the water jacket, and from the water jacket back to the heating chamber, and a water heater located in a parallel circuit, one end of said heater being connected to the heating chamber, and the other end to the water jacket.

7. A coffee urn having a reservoir for the liquid coffee, a water jacket surrounding it, a water heating chamber, a water heater, and pipe connections whereby the heater and the water jacket are arranged in parallel circuits to each other with respect to the water heating chamber.

8. A coffee urn comprising an upper hot water tank, a lower prepared coffee tank, a central chamber between said tanks, a door opening into said chamber, a ground coffee container in said chamber, and means for passing hot water from said hot water tank through said ground coffee container into said prepared coffee tank.

9. A coffee urn comprising a prepared coffee tank, a hot water tank above said prepared coffee tank and spaced therefrom to form a chamber, a removable ground coffee container in said chamber above said prepared coffee tank, heating means associated with said hot water tank, means for passing hot water from said water tank over the ground coffee in said container into said prepared coffee tank, a heat insulated wall surrounding said tanks and said chamber, and a door in said wall opening into said chamber to give access to said ground coffee container.

10. A coffee urn comprising an upper hot water tank, a lower prepared coffee tank, a central chamber between said tanks, a ground coffee container in said chamber, means for passing hot water from said hot water tank through said ground coffee container into said prepared coffee tank, a hot water jacket surrounding said prepared coffee tank, a connection between said water jacket and said hot water tank, and heating means associated with said tanks.

11. A coffee urn having three compartments, one above the other, the upper compartment for the storage of hot water, the lower compartment having a coffee reservoir, and the middle compartment having a receptacle for coffee grounds, the receptacle being removable and the urn having a door in the side through which the coffee receptacle may be withdrawn without interfering with the upper or lower compartments, there being also a spray nozzle in the middle compartment for spraying water onto the coffee grounds, and connections between the upper compartment and the spray nozzle.

12. A coffee urn having three compartments, one above the other, the upper compartment for storage of hot water, the lower compartment having a coffee reservoir and an enclosing water jacket, and the middle compartment having a receptacle for coffee grounds, a spray nozzle and connections for leading water from the upper compartment to the spray nozzle for spraying the coffee, a heater for the water, and pipe connections leading from the heater to the upper compartment and from the upper compartment to the water jacket, and from the water jacket back to the heater.

13. A coffee urn having three compartments, one above the other, the upper compartment for storage of hot water, the lower compartment having a coffee reservoir and an enclosing water jacket, and the middle compartment having a receptacle for coffee grounds, a spray nozzle and connections for leading water from the upper compartment to the spray nozzle for spraying the coffee, a heater for the water, and pipe connections leading from the heater to the upper compartment and from the upper compartment to the water jacket, and from the water jacket back to the heater, and an independent duct leading from the upper compartment directly back to the heater for providing an additional water circuit.

14. A coffeee urn comprising a hot water tank, a prepared coffee tank, a ground coffee container, means for passing hot water from said hot water tank over the ground coffee into said prepared coffee tank, a hot water jacket surrounding said prepared coffee tank, a water heater connected to heat the water in said hot water tank and jacket, and means for disconnecting said heater from said jacket whereby cold water may be admitted to said tank and heated independently of the hot water in said jacket.

15. A coffee urn having a liquid coffee reservoir, a water jacket therefor, a heating chamber, a heater, and two independent water circuits arranged in parallel and including the heater as a duct common to both circuits, one of the circuits including the heating chamber and the water jacket.

16. A coffee urn having a liquid coffee reservoir, a water jacket therefor, a heating chamber, a heater, two independent water circuits arranged in parallel and including the heater as a duct common to both circuits, one of the circuits including the heating chamber and the water jacket, and means for supplying cold water at will to the heater and to the water jacket, independently of each other.

In witness whereof, I have hereunto set my hand this 25th day of July, 1924.

JACOB L. SHROYER.